United States Patent
Chang et al.

(10) Patent No.: US 6,303,725 B1
(45) Date of Patent: Oct. 16, 2001

(54) CYCLIC DIONE POLYMER

(75) Inventors: Sheng-Yueh Chang, Taipei; Bang-Chein Ho, Hsinchu; Jian-Hong Chen, Hsinchu; Ting-Chun Liu, Hsinchu; Tzu-Yu Lin, Hsinchu, all of (TW)

(73) Assignees: Industrial Technology Research Institute, Hsinchu; Everlight Chemical Industrial Corporation, Taipei, both of (TW)

( * ) Notice: Subject to any disclaimer, the term of this patent is extended or adjusted under 35 U.S.C. 154(b) by 0 days.

(21) Appl. No.: 09/675,875

(22) Filed: Sep. 29, 2000

Related U.S. Application Data

(62) Division of application No. 09/213,943, filed on Dec. 17, 1998, now Pat. No. 6,197,476.

(30) Foreign Application Priority Data

Jun. 30, 1998 (TW) .................................. 87110549

(51) Int. Cl.[7] ..................................... C08F 34/00
(52) U.S. Cl. .................. 526/266; 526/240; 526/256; 526/265; 526/268; 526/274; 526/279; 526/281; 526/291; 526/316; 528/403
(58) Field of Search ..................... 526/266, 240, 526/256, 265, 268, 274, 279, 281, 291, 316; 528/403

(56) References Cited

U.S. PATENT DOCUMENTS

| | | | |
|---|---|---|---|
| 3,539,595 | * 11/1970 | Heydkamp et al. | .................. 526/266 |
| 3,928,497 | 12/1975 | Ohmori et al. | . |
| 4,086,090 | 4/1978 | Kohashi et al. | . |

* cited by examiner

Primary Examiner—Christopher Henderson
(74) Attorney, Agent, or Firm—Darby & Darby

(57) ABSTRACT

The present invention provides a cyclic dione polymer, which is a homopolymer or a copolymer of a cyclic dione monomer selected from those represented by formulae (I) and (II)

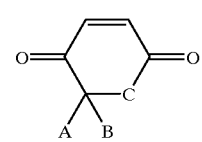

(I)

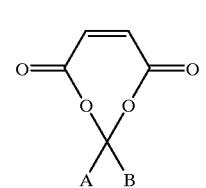

(II)

wherein
A and B may be the same or different and are independently selected from the group consisting of halogen, hydrogen, $C_{3-20}$ cyclic or pericyclic alkyl, $C_{1-20}$ linear and branched alkyl, $C_{6-20}$ aryl, $C_{7-20}$ arylalkyl, $C_{7-20}$ alkylaryl, silyl, alkylsilyl, germyl, alkylgermyl, alkoxycarbonyl, acyl, and a heterocylic group; or, A and B are linked together to form a $C_{3-20}$ saturated or unsaturated cyclic hydrocarbon group or a substituted or unsubstituted heterocyclic group;

C is selected from the group consisting of oxygen, sulfur,

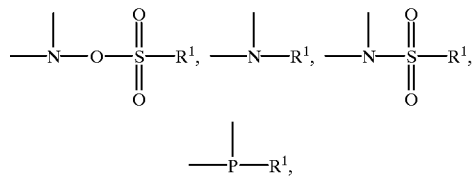

—$CH_2$—, and —$SiH_2$—,
wherein each $R^1$ is independently selected from $C_{1-20}$ alkyl and phenyl.

14 Claims, No Drawings

CYCLIC DIONE POLYMER

This is a divisional of application Ser. No. 09/213,943, filed Dec. 17, 1998 now U.S. Pat. No. 6,197,476. This prior application is hereby incorporated herein by reference, in its entirety.

BACKGROUND OF THE INVENTION

1. Field of the Invention

The present invention relates to a novel cyclic dione polymer, and more particularly relates to a novel cyclic dione polymer that is suitable for use in thin film coating and photoresist technology.

2. Description of the Prior Art

Nowadays, thin film coating and photoresist technology play very important roles in chemical engineering technology. A resin suitable for thin film coating should meet the requirements of not only having good film properties and good adherence to substrates, but also having good stability over a long storage time and low moisture absorbability. Therefore, a suitable resin should not have too many functional groups of high moisture absorbability. To be considered for application in IC photoresists, a suitable resin should further have other properties such as high etch and heat resistance, properties which are frequently achieved by molecular design.

To date, the most frequently used resin for thin film coating is the copolymer of a maleic anhydride derivative and norbornene, which has been disclosed in U.S. Pat. No. 3,928,497. Such a resin is suitable for being applied in IC photoresists because it has a broad processing window and linear relationship. However, since maleic anhydride easily absorbs moisture to form acid molecules, it has an inferior shelf life. Moreover, when the humidity in the air varies greatly, the $E_0$ (photo speed) and $\gamma$ (contrast) will be difficult to be controlled; therefore, a stable line width of good properties can not be obtained. Since the disadvantage of high absorbability of said resin is due to its chemical structure, incorporating a plastisizer of low moisture absorbability is the only way to date of decreasing the absorbability of the maleic anhydride derivative/norbornene copolymer. In addition, said copolymer has other disadvantages: the glass transition temperature is too high, the film properties are inferior, and the film will easily crack.

SUMMARY OF THE INVENTION

Therefore, an object of the present invention is to solve the above-mentioned problems and to provide a novel resin which has a lower moisture absorbability and transition temperature, good adherence and storage stability, and can be used in thin film coating and photoresist technology.

To achieve the above object, the present invention uses specific monomers to prepare resins, so as to improve the properties of the resins. The present invention uses a cyclic dione monomer to replace the conventional maleic anhydride derivative, and further provides a resin system prepared from such a cyclic dione monomer. Since such a cyclic dione monomer has low moisture absorbability, the resin prepared from the monomer will have a decrease moisture absorbability.

The novel resin system of the present invention is a cyclic dione polymer, which is a homopolymer or a copolymer of a cyclic dione monomer selected from those represented by formulae (I) and (II)

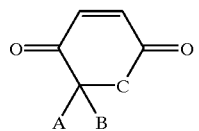

(I)

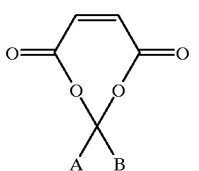

(II)

wherein

A and B may be the same or different and are independently selected from the group consisting of halogen, hydrogen, $C_{3-20}$ cyclic or pericyclic alkyl, $C_{1-20}$ linear and branched alkyl, $C_{6-20}$ aryl, $C_{7-20}$ arylalkyl, $C_{7-20}$ alkylaryl, silyl, alkylsilyl, germyl, alkylgermyl, alkoxycarbonyl, acyl, and a heterocyclic group; or, A and B are linked together to form a $C_{3-20}$ saturated or unsaturated cyclic hydrocarbon group or a substituted or unsubstituted heterocyclic group;

C is selected from the group consisting of oxygen, sulfur,

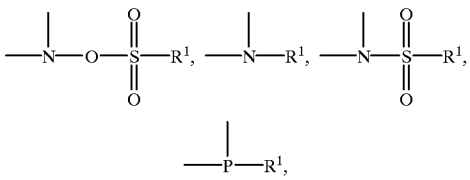

—$CH_2$—, and —$SiH_2$—, wherein each $R^1$ is independently selected from $C_{1-20}$ alkyl and phenyl.

Representative examples of the cyclic dione monomers of formula (I) include

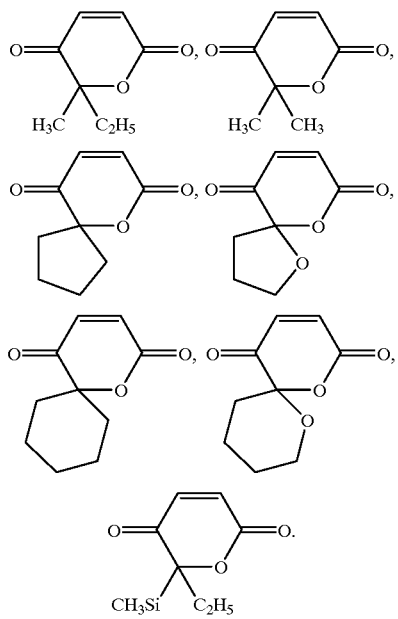

Representative examples of the cyclic dione monomers of formula (II) include

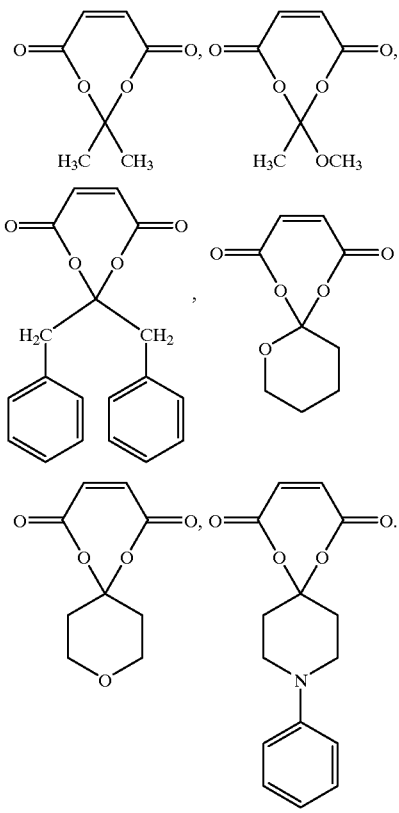

The cyclic dione polymer of the present invention can also be a copolymer including a cyclic olefin comonomer. That is, the cyclic dione polymer of the present invention can be a copolymer of at least one cyclic dione monomer of formula (I) or (II) and at least one comonomer of a cyclic olefin. The cyclic olefin suitable for use can be norbornene or a norbornene derivative.

The norbornene derivative can be

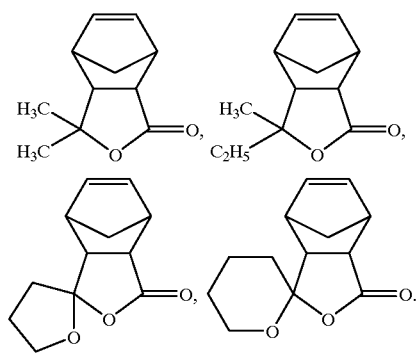

The norbornene derivative can also be a compound having the following formula:

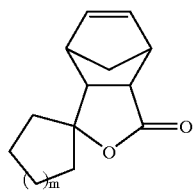

wherein m is an integer from 1 to 3; or a compound having the following formula:

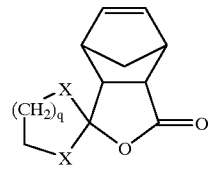

wherein q is an integer from 1 to 3, and X is selected from O, N, or S.

A "chemically amplified resist" is a kind of photoresist in which the rate of dissolution in a developer can be changed by an acid produced by photoirradiation. Such a photoresist solution includes a protected resin, a photoacid generator, and a solvent. The so-called protected resin is a resin that is protected by an acid-labile protective group. The resin will be converted into alkali-soluble when the acid-labile protective group is decomposed. When the chemically amplified resist applied on a substrate is exposed to light, the photoacid generator will generate acid, and the acid will decompose the acid-labile protective group in the resin, thus making the resin soluble in an alkali developer Therefore, if the cyclic dione polymer of the present invention is used for a chemically amplified resist, such a cyclic dione polymer preferably has an acid-labile protective group, which will be decomposed in the presence of an acid so that the cyclic dione polymer will be converted into an alkali-soluble polymer.

Such an acid-labile protective group may be present in formula (I), formula (II), a cyclic olefin comonomer that can be copolymerized with formula (I) or (II), or present in any monomer that can be copolymerized with formula (I) or (II).

For example, a cyclic olefin comonomer that can be copolymerized with formula (I) or (II) can be norbornene or a norbornene derivative. Such a norbornene derivative can have an acid-labile protective group D. Thus, when the cyclic dione polymer of the present invention is in the presence of an acid, the protective group D will be decomposed, such that the cyclic dione polymer will be converted to an alkali soluble polymer. Such norbornene derivatives include:

(V)

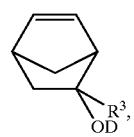

-continued (VI)
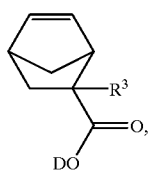

(VII)
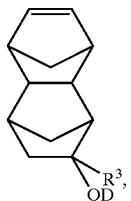

(VIII)
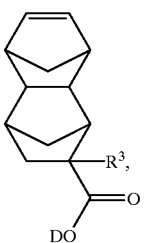

wherein

D is an acid-labile protective group, which is decomposed in the presence of an acid, so as to make the cyclic dione polymer alkali-soluble, and each $R^3$ is independently selected from the group consisting of hydrogen, $C_{1-20}$ linear and branched alkyl, $C_{3-20}$ cyclic and pericyclic alkyl.

Representative examples of D include:

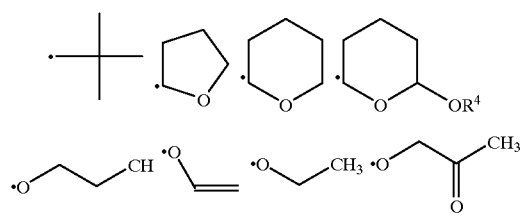

-continued

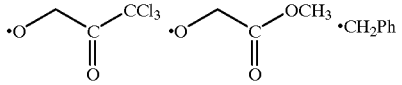
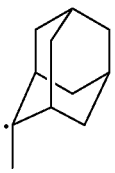
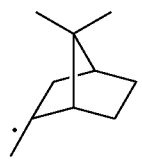

wherein $R^1$ is selected from the group consisting of hydrogen, $C_{1-20}$ linear and branched alkyl, $C_{3-20}$ cyclic and pericyclic alkyl.

As described above, the cyclic dione polymer of the present invention can be a copolymer of at least one cyclic dione monomer of formula (I) or (II) and at least one comonomer of a cyclic olefin. For example, formula (I) can be reacted with any above-mentioned norbornene derivative containing an acid-labile protective group via free radical polymerization. Also, formula (II) can be reacted with any above-mentioned norbornene derivative containing an acid-labile protective group via free radical polymerization. The obtained cyclic dione polymer can be represented by formula (III):

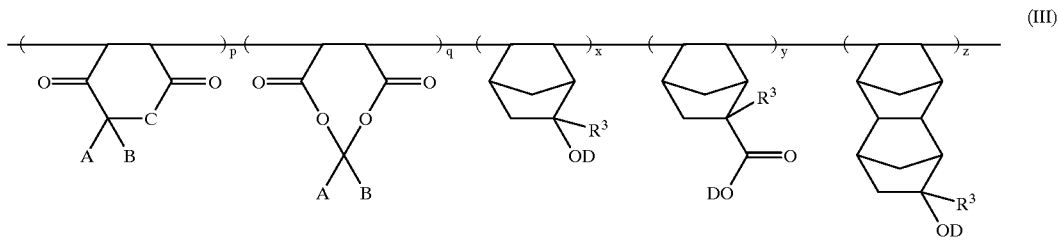

(III)

wherein

A, B, C, D, and $R^3$ are defined as above, p, q, x, y, and z are the molar ratios of the corresponding monomers, $p+q+x+y+z=1$, p, q, x, y, and z are in the range of 0 to 0.5, $p+q$ is larger than 0, and $x+y+z$ is in the range of 0 to 0.8.

Particularly, the obtained cyclic dione polymer can be represented by formula (IV):

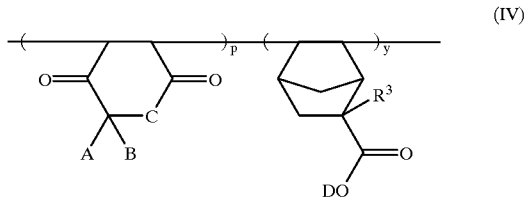

(IV)

wherein
A, B, C, D, and $R^3$ are defined as above,
p and y are the molar ratios of the corresponding monomers,
p+y=1, and
p and y are in the range of 0.1 to 0.9.

The cyclic dione polymer of the present invention is not limited to those obtained via free radical polymerization. All homopolymers and copolymers obtained by using the cyclic dione monomer of formula (I) or (II) as the monomer are within the scope of the present invention, no matter what the polymerization is. The polymerization can be free radical polymerization, stepwise polymerization, anionic polymerization, or cationic polymerization.

To make the cyclic dione polymer of the present invention suitable for thin film coating, the obtained cyclic dione polymer is preferably soluble in an organic solvent. A preferable cyclic dione polymer of the present invention has a glass transition temperature of 130° C. to 300° C., a weight average molecular weight of 1000 to 50000, and a decomposition temperature ($T_d$) higher than 130° C. Such cyclic dione polymers that meet these requirements are very suitable for use as the resin for thin film coating. Thin film coating can be applied to the coating of photosensitive inks, printing inks, photoresists, and surface coating materials.

When the cyclic dione polymer of the present invention is applied to a photoresist (photosensitive composition), a preferred wavelength range is from 150 nm to 600 nm, most preferably at a wavelength of 193 nm or 248 nm. When the cyclic dione polymer of the present invention includes an acid-labile protective group, it is most suitable for use in chemically amplified photoresists.

The cyclic dione polymer of the present invention can be blended with any other polymer to form a polymer blend. Thereby, the polymer blend can impart properties that the original cyclic dione polymer does not have, thus meeting various needs.

The advantages of the present invention can be summarized as follows:
1. The present invention uses a cyclic dione monomer to replace the maleic anhydride derivative as a monomer, such that the properties of the resulting resin can be improved by the improved monomer. Since the cyclic dione monomer has low moisture absorbability, the resulting novel resin containing such a cyclic dione will have low moisture absorbability, thus causing the resin to be more stable and have a long shelf life.
2. The resin can impart good adherence to the substrate by the ketone group contained in the cyclic dione monomer.
3. By means of the suitable alkyl group linked on the cyclic dione monomer, the freedom of the resin can be increased, thus lowering the glass transition temperature (Tg) of the resin to about 130° C. to 300° C. Moreover, the cyclic dione polymer of the present invention has a weight average molecular weight of about 1000 to 50000; therefore, it has good film properties and will not crack.
4. When the cyclic dione polymer of the present invention contains an acid-labile protective group, it can be applied in chemically amplified photoresists. Since exposure to light can cause the cyclic dione polymer of the present invention to undergo a distinguishing change in solubility, the $E_0$ (photo speed) and γ (contrast) are excellent for applications.

The following examples are intended to illustrate the process and the advantages of the present invention more fully without limiting its scope, since numerous modifications and variations will be apparent to those skilled in the art.

EXAMPLE 1

Synthesis of the Cyclic Dione Polymer (Resin)

15.4 g of 2-methyl-2-ethyl-2H-pyran-3,6-dione, 9.81 g of t-butyl-2-carboxylate-5-[2,2,1$^{1,4}$]heptene (a norbornene derivative), and 0.81 g of 2,2'-azobisisobutyronitrile (AIBN) were dissolved in 25 g of tetrahydrofuran (THF) and heated at 70° C. for 8 hours. The reaction solution was dropped into a mixed solution of 100 ml of isopropanol and 100 ml of n-hexane to obtain 6.28 g of the resin (cyclic dione polymer) as a white solid. The resin has a Td of 192° C. (analyzed by TGA), a Tg (analyzed by DSC) higher than Td, a weight average molecular weight of 3604 (analyzed by GPC), and a resin synthesis conversion ratio of 25.1%.

EXAMPLE 2

Test of Film Properties of the Resin 1.5 g of the resin obtained from Example 1 was dissolved in 8.5 g of PGMEA (propylene glycol monomethyl ether acetate) and stirred for 8 hours. The mixture was filtered through a 0.2 μm filter. 2 ml of the filtrate was applied to a 4 inch wafer by spin coating at 3000 rpm and soft baked at 130° C. The film thickness-was measured at sixteen points by Nanospec as 5728±32 Å, indicating that the film properties are good.

EXAMPLE 3

Test of the Water Content of the Resin 2.5 g of the resin obtained from Example 1 was dissolved in THF and stirred for 8 hours to obtain a 25% THF solution of resin. The resin solution was kept still at room temperature for 3 days. 4 to 5 g of the resin solution was titrated with Hydraual Composite 5 as a standard solution by using a Karl-Fischer instrument. The results showed that the resin has a water content of 0.589%.

COMPARATIVE EXAMPLE

The same procedures as described in Example 1 were employed except that 2-methyl-2-ethyl-2H-pyran-3,6-dione was replaced with maleic anhydride, thus, a copolymer of maleic anhydride was obtained. Then, a 25% maleic anhydride copolymer solution was prepared according to the method as described in Example 3. The water content of the resin (maleic anhydride copolymer) was measured to be 0.886%.

The results show that the resin (cyclic dione polymer) of the present invention has a lower moisture absorbability than the conventional maleic anhydride copolymer resin; therefore, it has better stability and longer shelf life.

What is claimed is:

1. A cyclic dione polymer, which is a copolymer of (a) a cyclic dione monomer selected from those represented by formulae (I) and (II)

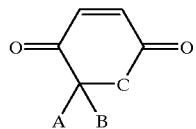
(I)

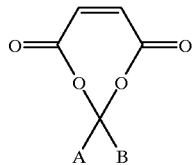
(II)

wherein

A and B are the same or different and are independently selected from the group consisting of halogen, hydrogen, methoxy, $C_{3-20}$ cyclic or pericyclic alkyl, $C_{1-20}$ linear and branched alkyl, $C_{6-20}$ aryl, $C_{7-20}$ arylalkyl, $C_{7-20}$ alkylaryl, silyl, alkylsilyl, germyl, alkylgermyl, alkoxycarbonyl, acyl, and a heterocyclic group; or, A and B are linked together to form a $C_{3-20}$ saturated or unsaturated cyclic hydrocarbon group or a substituted or unsubstituted heterocyclic group;

C is selected from the group consisting of oxygen, sulfur,

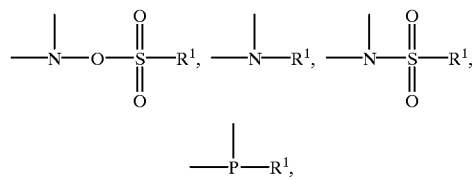

—CH$_2$—, and —SiH$_2$—, wherein each $R^1$ is independently selected from $C_{1-20}$ alkyl and phenyl; and (b) a norbornene monomer or a norbornene derivative monomer selected from the group consisting of

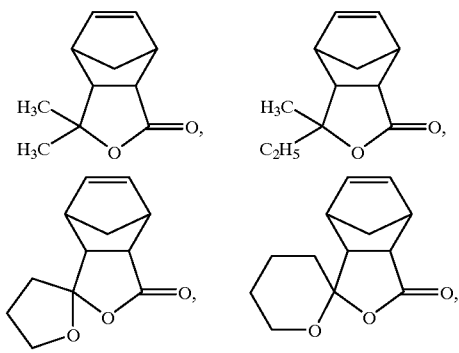

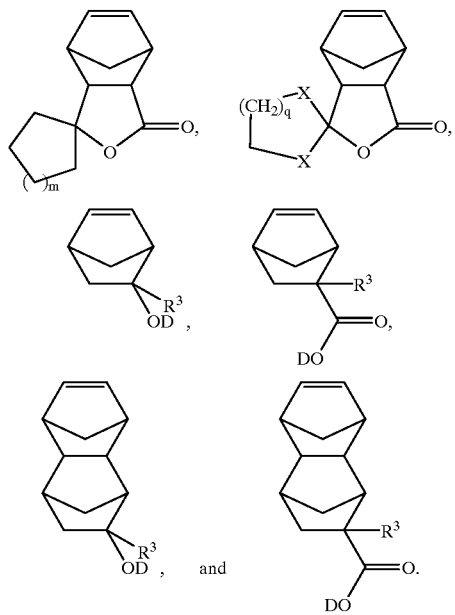

wherein m and q are independently integers from 1 to 3,

X is selected from O, —NH—, and S,

D is an acid-labile protective group, which is decomposed in the presence of an acid, so as to make the cyclic dione copolymer alkali-soluble, and $R^3$ is selected from the group consisting of hydrogen, $C_{1-20}$ linear and branched alkyl, and $C_{3-20}$ cyclic and pericyclic alkyl.

2. The cyclic dione polymer as claimed in claim 1, wherein he cyclic dione monomer of formula (I) is selected from the group consisting of

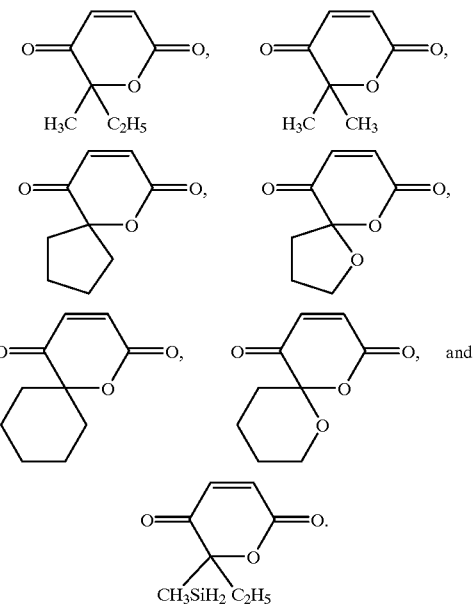

3. The cyclic dione polymer as claimed in claim 1, wherein the cyclic dione monomer of formula (II) is selected from the group consisting of

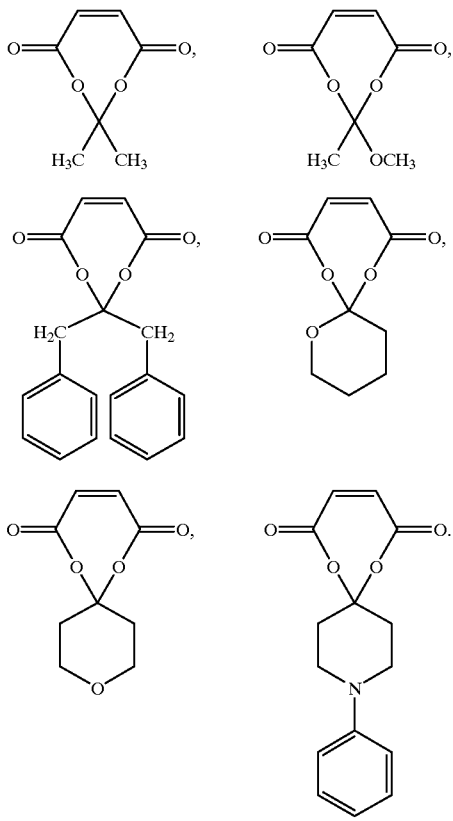

4. The cyclic dione polymer as claimed in claim 1, wherein D is selected from the group consisting of

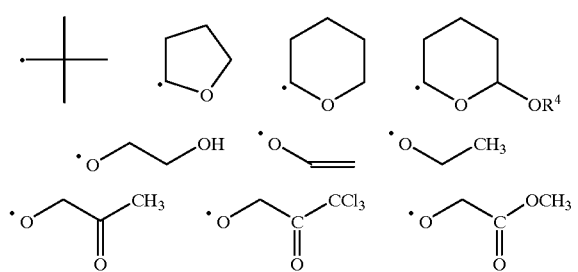

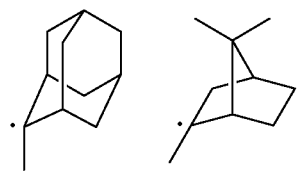

wherein $R^4$ is selected from the group consisting of hydrogen, $C_{1-20}$ linear and branched alkyl, $C_{3-20}$ cyclic and pericyclic alkyl.

5. The cyclic dione polymer as claimed in claim 1, wherein the cyclic dione monomer is

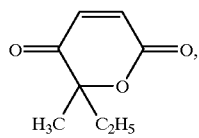

and the norbornene derivative is

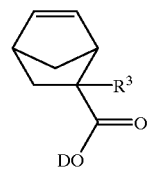

wherein

D is an acid-labile protective group, which is decomposed in the presence of an acid, so as to make the cyclic dione polymer alkali-soluble; and $R^3$ is independently selected from the group consisting of hydrogen, $C_{1-20}$ linear and branched alkyl, and $C_{3-20}$ cyclic and pericyclic alkyl.

6. The cyclic dione polymer as claimed in claim 1, which is

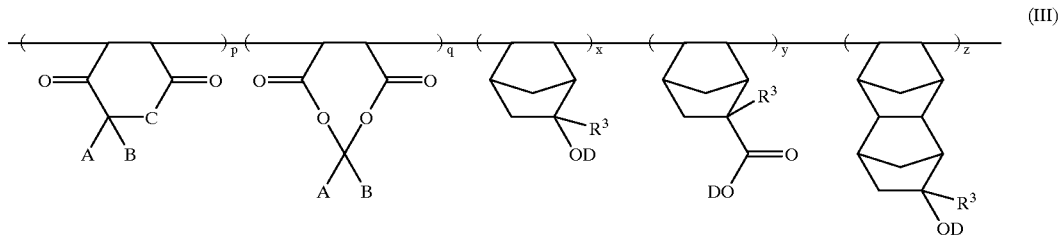

wherein
A and B are the same or different and are independently selected from the group consisting of halogen, hydrogen, methoxy, $C_{3-20}$ cyclic or pericyclic alkyl, $C_{1-20}$ linear and branched alkyl, $C_{6-20}$ aryl, $C_{7-20}$ arylalkyl, $C_{7-20}$ alkylaryl, silyl, alkylsilyl, germyl, alkylgermyl, alkoxycarbonyl, acyl, and a heterocyclic group; or, A and B are linked together to form a $C_{3-20}$ saturated or unsaturated cyclic hydrocarbon group or a substituted or unsubstituted heterocyclic group;

C is selected from the group consisting of oxygen, sulfur,

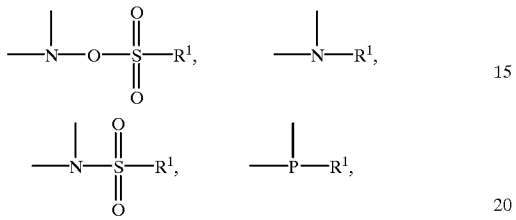

—$CH_2$—, and —$SiH_2$—;

$R^1$ is independently selected from $C_{1-20}$ alkyl and phenyl;

D is an acid-labile protective group, which is decomposed in the presence of an acid, so as to make the cyclic dione polymer alkali-soluble;

$R^3$ is independently selected from the group consisting of hydrogen, $C_{1-20}$ linear and branched alkyl, and $C_{3-20}$ cyclic and pericyclic alkyl, p, q, x, y, and z are the molar ratios of the corresponding monomers, p+q+x+y+z=1, p, q, x, y, and z are in the range of 0 to 0.5, p+q is larger than 0, and x+y+z is in the range of 0 to 0.8.

7. The cyclic dione polymer as claimed in claim 1, which is

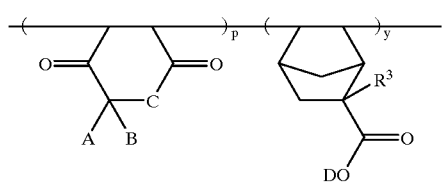

(IV)

wherein
A and B are the same or different and are independently selected from the group consisting of halogen, hydrogen, methoxy, $C_{3-20}$ cyclic or pericyclic alkyl, $C_{1-20}$ linear and branched alkyl, $C_{6-20}$ aryl, $C_{7-20}$ arylalkyl, $C_{7-20}$ alkylaryl, silyl, alkylsilyl, germyl, alkylgermyl, alkoxycarbonyl, acyl, and a heterocyclic group; or, A and B are linked together to form a $C_{3-20}$ saturated or unsaturated cyclic hydrocarbon group or a substituted or unsubstituted heterocyclic group;

C is selected from the group consisting of oxygen, sulfur,

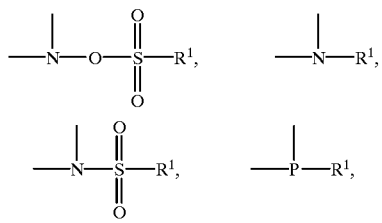

—$CH_2$—, and —$SiH_2$—;

$R^1$ is independently selected from $C_{1-20}$ alkyl and phenyl;

D is an acid-labile protective group, which is decomposed in the presence of an acid, so as to make the cyclic dione polymer alkali-soluble;

$R^3$ is independently selected from the group consisting of hydrogen, $C_{1-20}$ linear and branched alkyl, and $C_{3-20}$ cyclic and pericyclic alkyl, p and y are the molar ratios of the corresponding monomers, p+y=1, and p and y are in the range of 0.1 to 0.9.

8. The cyclic dione polymer as claimed in claim 1, which is soluble in an organic solvent.

9. The cyclic dione polymer as claimed in claim 1, which has a glass transition temperature of 130° C. to 300° C.

10. The cyclic dione polymer as claimed in claim 1, which has a weight average molecular weight of 1000 to 50000.

11. The cyclic dione polymer as claimed in claim 1, which has a decomposition temperature ($T_d$) higher than 130° C.

12. The cyclic dione polymer as claimed in claim 1, which is obtained via free radical polymerization.

13. The cyclic dione polymer as claimed in claim 1, wherein the cyclic dione polymer has an acid-labile protective group, which is decomposed in the presence of an acid, so as to make the cyclic dione polymer alkali-soluble.

14. A thin film coating composition, comprising the cyclic dione polymer as claimed in claim 1.

* * * * *